United States Patent
Brady et al.

[11] Patent Number: 5,681,400
[45] Date of Patent: *Oct. 28, 1997

[54] SELF-OPTIMIZING DETERGENT CONTROLLER FOR CONTROLLING VARIABLE ADDITIVE CONCENTRATION LEVEL IN A WAREWASHING MACHINE

[75] Inventors: Daniel F. Brady, Eagan; John E. McCall, Jr., West St. Paul; Clyde A. Bailey, Hastings; James L. Copeland, Burnsville, all of Minn.

[73] Assignee: Ecolab Inc., St. Paul, Minn.

[*] Notice: The term of this patent shall not extend beyond the expiration date of Pat. No. 5,404,893.

[21] Appl. No.: 408,560

[22] Filed: Mar. 21, 1995

Related U.S. Application Data

[60] Continuation-in-part of Ser. No. 372,052, Jan. 12, 1995, Pat. No. 5,556,478, which is a division of Ser. No. 849,750, Mar. 12, 1992, Pat. No. 5,404,893.

[51] Int. Cl.$^6$ .................................................. B08B 7/04
[52] U.S. Cl. .......................... 134/18; 134/25.2; 134/56 R; 134/57 D; 422/111
[58] Field of Search .................... 134/18, 25.2, 57 D, 134/57 R, 58 D, 58 R, 56 D, 56 R; 422/111, 110; 68/12.18, 12.02

[56] References Cited

U.S. PATENT DOCUMENTS

| | | | |
|---|---|---|---|
| 2,850,760 | 9/1958 | Vanderwalker | 16/360 |
| 3,154,218 | 10/1964 | Aubert | 222/652 |
| 3,203,436 | 8/1965 | Wallgren et al. | 134/58 D |
| 3,402,853 | 9/1968 | Perl | 222/651 |
| 3,774,056 | 11/1973 | Sample et al. | 367/293 |
| 3,807,418 | 4/1974 | Jenkins | 134/57 D |
| 3,896,827 | 7/1975 | Robinson | 134/10 |
| 4,053,743 | 10/1977 | Niemi | 364/500 |
| 4,076,554 | 2/1978 | Weihe | 134/10 |
| 4,142,539 | 3/1979 | Shih et al. | 134/113 |
| 4,241,400 | 12/1980 | Kiefer | 364/400 |
| 4,245,309 | 1/1981 | Kiefer | 364/400 |
| 4,463,582 | 8/1984 | Saalmann et al. | 68/17 R |
| 4,509,543 | 4/1985 | Livingston et al. | 134/57 D |
| 4,756,321 | 7/1988 | Livingston et al. | 134/156 D |
| 4,818,408 | 4/1989 | Hamamoto | 210/614 |
| 4,848,381 | 7/1989 | Livingston et al. | 134/57 R |
| 4,858,449 | 8/1989 | Lehn | 68/12 R |
| 4,964,185 | 10/1990 | Lehn | 8/158 |
| 5,014,211 | 5/1991 | Turner et al. | 364/478 |
| 5,038,807 | 8/1991 | Bailey et al. | 134/57 D |
| 5,186,912 | 2/1993 | Steindorf et al. | 422/263 |
| 5,207,080 | 5/1993 | Reinhard | 658/12.18 |
| 5,257,717 | 11/1993 | Hara | 228/173.6 |
| 5,385,044 | 1/1995 | Toetschinger et al. | 73/295 |
| 5,389,344 | 2/1995 | Copeland et al. | 422/264 |
| 5,404,893 | 4/1995 | Brady et al. | 134/18 |

FOREIGN PATENT DOCUMENTS

| | | |
|---|---|---|
| 68-267 | 1/1983 | European Pat. Off. . |
| 0229038 | 7/1987 | European Pat. Off. . |
| 262584 | 4/1988 | European Pat. Off. . |
| 3314992 | 10/1984 | Germany . |
| 3400495 | 7/1985 | Germany . |
| 6021-118-B | 5/1986 | Japan . |
| 63077-493-A | 4/1988 | Japan . |
| 673-680 | 7/1979 | U.S.S.R. . |
| WO93/17611 | 9/1993 | WIPO . |

*Primary Examiner*—Arlen Soderquist
*Assistant Examiner*—Saeed Chaudhry
*Attorney, Agent, or Firm*—Merchant, Gould, Smith, Edell, Welter & Schmidt

[57] ABSTRACT

An apparatus and method for programming a controller to vary the concentration set-point of an additive as a function of time. The present invention insures that the additive is injected to the machine at proper times to allow for optimum efficiency and lowest cost. To vary the set-point according to the input parameters, the invention combines the features of a data entry device, a microprocessor, a clock, a controller, and sensors into one unit. The user may enter a time setting and set point into the controller, along with control parameters which allow the machine to control the additive injection based on different user-defined scenarios. The microprocessor then reads the settings and outputs an appropriate set-point value from the microprocessor to the controller. Thus, the user can manually or automatically change the response function if and when conditions change.

35 Claims, 3 Drawing Sheets

SELF-OPTIMIZING DETERGENT CONTROLLER FOR CONTROLLING VARIABLE ADDITIVE CONCENTRATION LEVEL IN A WAREWASHING MACHINE

CROSS-REFERENCE TO RELATED APPLICATIONS

This application is a continuation-in-part of patent application Ser. No. 08/372,052, filed Jan. 12, 1995, by Daniel F. Brady, et al., entitled "SELF-OPTIMIZING DETERGENT CONTROLLER", now U.S. Pat. No. 5,556,478, which is a divisional of patent application Ser. No. 07/849,750, filed Mar. 12, 1992, by Daniel F. Brady, et al., entitled "METHOD AND APPARATUS FOR CONTROLLING VARIABLE DETERGENT CONCENTRATION LEVELS IN A WAREWASHING MACHINE," now U.S. Pat. No. 5,404,893, issued Apr. 11, 1995, both of which applications are assigned to the assignee of the present invention, and both of which are incorporated by reference herein.

BACKGROUND OF THE INVENTION

1. Field of the Invention

This invention relates in general to a method and apparatus for controlling the automatic injection of an additive for a process, and more specifically, to a method and apparatus for controlling the injection of the additive by measurement of an external parameter, by entering a user defined parameter, or by a combination of measuring and entering parameters, and then making a comparison thereof.

2. Description of Related Art

There are many situations where the injection of an additive into a system needs to be controlled. Often, a fixed amount of additive is added to the system at the beginning of a process. For example, some prior warewashing machine systems merely added a fixed amount of detergent at the beginning of every wash cycle. However, it is also known in the art to provide warewashing machines with detergent controllers. Typically, such systems operate in an on-off mode, proportional mode, or a combination thereof. However, common to other processes, such as chain and motor lubrication devices, odor control mechanisms, and preparation and service systems in the food and beverage industries.

By way of illustration, warewashing systems control detergent and rinse agent concentration levels to pre-set concentration levels (set-points). These systems do not compensate for varying injection rates and therefore often exceed these set-points. These warewashing systems indirectly sense detergent or rinse agent concentration by measuring solution conductivity.

The major perceived benefits of this type of controller is that the addition of, and concentration maintenance of, additives to the warewashing machine process is achieved without manual intervention.

However, this type of controllers has some major shortcomings. The additive concentration set-point consists of a single pre-set value for all cycles. Unless the set-point is manually reset, the process is subjected to the same concentrations of additive regardless of any external or internal parameters that might affect the effectiveness of the additive. Therefore, to be certain of maintaining acceptable results, the set-point is selected for a worst case condition. This results in additive overuse.

Another shortcoming of present controllers is that system conditions and background levels of other agents in a process can vary as a function of time. Varying conditions can directly influence the quality of the results of a given process. System conditions may demand a different concentration of additive agent to provide optimum results. For example, greater soil loads in warewashing machines will require a greater concentration of rinse agent to provide effective sheeting and spot free appearance of the processed wares.

Further, it is known that in certain environments, various additives are injected on a continuous or semi-continuous basis to facilitate proper operations for both personnel and machinery. The problems of various activity levels throughout the day for processing facilities, laboratories, lobbies, back of the house areas, etc., correlate to the time of day. These problems are evident in odor control treatment, drain traps for food service establishments, industrial pest control, and conveyors used in manufacturing and processing environments.

In addition, some processes require more than one additive be controlled or sequenced. Current technology sets each additive set-point for a worst case scenario, or leaves the sequencing to a manual process. This problem is evident in food service, food preparation, and food processing establishments, where floor surfaces tend to accumulate soil over time and represent an employee safety hazard due to slips and falls. Many cleaning treatments of these floor surfaces have improved the safety of the floor surface by removal of soil but have not been effective in restoring the surface to its original safe condition. However, floor surfaces may be more effectively cleaned by utilizing a proper sequence of cleaning protocols tailored to remove specific soil type buildup. Strict adherence to a daily cleaning regimen restores the floor surface to a clean and safe condition. To insure the cleaning performance of this regimen, it is necessary to insure the use of the proper cleaning solution sequence.

Specific types of processes are continuous processes. However, background contaminants may hamper the ability of the user to effectively measure the proper amount of additive to inject into the process. For example, in a warewashing process, wares are loaded on a conveyor that passes through an enclosure containing spray devices to create a shower of cleaning solution. At the end of the enclosure, the wares are rinsed with water. At the beginning of the process, the warewashing machine is freshly filled with water and an amount of detergent is added to bring it to a suitable cleaning concentration. As wares are processed, the wash solution reservoir builds up with soil. Typically, the detergent concentration is measured indirectly by measuring the conductivity of the wash solution. Since much of the soil removed from the wares is also conductive, as soil builds up, the effective conductivity attributable to detergent declines, resulting in an insufficient amount of additional detergent added to the machine during the wash cycle. An increased soil level also interferes with the ability of the final rinse to sheet, drain, and leave spot free wares. This type of problem is also evident in eggwashing, bottle washing, and other types of warewashing processes, as well as in batch processes such as washing pots and pans in food service institutions.

Other processes may require a continuous injection of additive during a cycle, when an external measurement tolerance is exceeded, or at other user-defined times. By way of illustration, conveyors in the dairy, food, and beverage processing industries require continuous addition of lubricant solution only during operation periods. The concentration of lubricant typically is set and maintained throughout the cycle of operation. As the conveyor is in operation between cleanup periods, it accumulates soil and buildup that impedes its operation.

Another example of an additive controller used in the food and dairy industry is where process equipment is frequently cleaned in place. In this type of controller a central system dilutes and transports cleaning solutions to the process equipment. Process equipment is then cleaned in a batch-wise fashion with preset cleaning solutions and protocols.

There are also processes where the need for additives is directly related to the ambient temperature and relative humidity. These processes include warewashers and odor control mechanisms. Higher temperatures can promote the maturation and diffusion of odors, and can affect the effectiveness of a cleaning operation in a warewashing machine. Relative humidity can also influence the perception of odor.

It can seen then that there is a need for improving the ability to control the amount of additives injected into specific processes based on an external measurement such as temperature, relative humidity, or conductivity of the solution.

It can also be seen then that there is a need for improving the ability to control the injection of additives into specific processes based on a user entered parameter.

It can also be seen then that there is a need for improving the ability to control the injection of additives into specific processes based on a comparison of user entered parameters and external measurements.

It can also be seen that there is a need for a controller that determines the additive set-point value as a function of time, whether elapsed or real time.

SUMMARY OF THE INVENTION

To overcome the limitations in the prior art described above, and to overcome other limitations that will become apparent upon reading and understanding the present specification, the present invention discloses a powerful and highly productive system and method for controlling the injection of an additive for a process under various conditions.

The present invention solves the above-described problems by providing a method for controlling the injection of an additive based upon the identification of system parameters.

A system in accordance with the principles of the present invention comprises a timer for providing a clock signal, means for identifying system parameters, processing capability to determine set-point values based on the system parameters, a controller to generate signals to control the regulator based upon the set-point value, and a regulator to control the injection of the additive.

One object of the present invention is that it allows flexibility for the user in terms of allowing the user to choose different set-points based on a vast array of factors. Another object of the present invention is that it allows the additive set-point to be determined as a function of time. Yet another object of the present invention is that the injection of additives into specific processes may be based on external measurements.

These and various other objects, advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiments, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

A preferred embodiment of the present invention provides a system to control detergent concentration set-points for warewashing machines with respect to time or other factors. The present invention leverages the sensing capability of the detergent controller by adding a microprocessor and a clock into the controller unit. By programming different detergent concentration set-points for different times of the day or for different scenarios, the variable detergent concentration controller can more effectively remove soil from the wash items. By enabling the microprocessor to accept inputs from the conductivity sensor, the thermistor, or other inputs, the effectiveness of the system in removing soil from the wash items is increased. Similarly, by allowing flexibility in the determination of the set point, whether it is continuously calculated by the microprocessor or calculated via a time period throughout the day, or by some other method, the warewashing machine can be programmed to be most effective. However, it is to be understood that this embodiment is presented for illustration only and is not meant to limit the invention. Those skilled in the art will recognize that other embodiments incorporating the teaching of the present invention are possible without departing from the invention.

Figure 1:
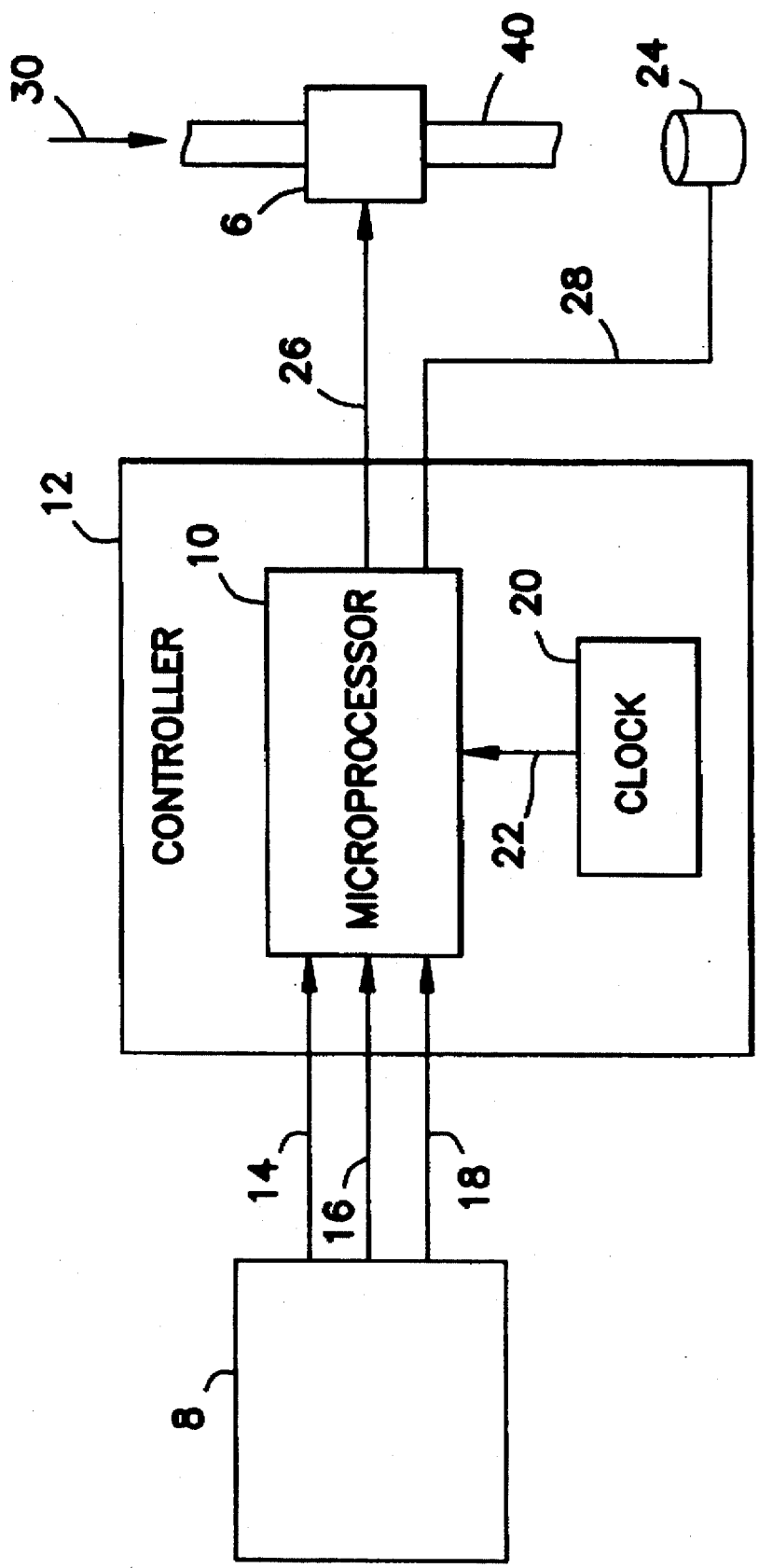
FIG. 1 is a block diagram of the variable detergent concentration set-point system according to the present invention.

FIG. 1 illustrates the block diagram of one embodiment of the invention as used in a variable additive concentration set-point system. The system includes a microprocessor 10 for determining an appropriate additive concentration set-point. The microprocessor 10 receives several types of inputs from the user via a user input device 8. Those skilled in the art will recognize that the user input device 8 may be a card reader, hard memory, keypad, or other means of entering data into the microprocessor 10.

A particular additive concentration set-point 14 may be entered into the microprocessor 10 from the user input device 8. Then, a user time setting 16 may be entered into the microprocessor 10 from the user input device 8. Accordingly, the user time setting 16 instructs the microprocessor 10 to begin using the corresponding additive concentration set-point at the time entered. In addition, a control parameter 18 may be entered into the microprocessor 10 from the user input device 8. The control parameter 18 instructs the microprocessor 10 to utilize any or all of the following to calculate the set-point: a specific operation profile; a continuous updating of the set point which is calculated by the microprocessor 10 as a function of time; a measured input 28 to the microprocessor 10; an elapsed time based on another user-defined event; or a continuous updating of the set point as a function of the process.

The system also includes a clock device 20 that provides the microprocessor 10 with a timing signal 22. The microprocessor 10 either compares the timing signal 22 to the user time setting 16, uses the elapsed time defined by the user to start the process, or if instructed via the control parameter 18, uses the control parameter values to control the solenoid valve 6. If the microprocessor is instructed to use the user time setting 16 as a comparison point, the microprocessor 10 loads an additive concentration set-point 14 which corresponds to the user time setting 16 when the timing signal 22 coincides with the user time setting 16. The additive controller 12 uses this corresponding additive concentration set-point 14 until the microprocessor 10 determines that another set-point should be used.

If the microprocessor 10 is instructed to use another comparison point or a continuous comparison point via the control parameter input 18, then the microprocessor 10 uses that information or other analog inputs 28 from sensor 24 to the microprocessor to determine the set point. Thus, the controller 12 can be pre-programmed to handle soil loads that vary cyclically with time.

A sensor 24 routes measurements 28 to the microprocessor 10. The inputs can be measurements of the additive concentration, temperature, relative humidity, or other relevant information.

If the sensor 24 is a conductivity sensor with an imbedded thermistor, the conductivity sensor signals the additive concentration 28 by determining conductivity using the measurement of the free ions in the tank 40 solution. The imbedded thermistor signals the temperature information 28 by determining the temperature of the tank 40 solution.

The conductivity sensor may be of an electrode or electrode-less type. An electrode-type conductivity sensor is typically comprised of two electrodes immersed in the tank 40 solution, wherein the current flow from one electrode to the other electrode corresponds to the conductivity of the solution. An electrode-less conductivity sensor, which operates as a transformer, is typically comprised of a primary coil inducing a current into the tank 40 solution and a secondary coil converting the current into a voltage level, wherein the voltage level corresponds to the conductivity of the solution.

The microprocessor 10 may also use the conductivity and temperature information 28 provided by the sensor 24 to determine tank 40 changeover, additive consumption, and additive feed. With regard to tank 40 changeover, the microprocessor 10 can determine when the tank 40 has been recharged with fresh water using the additive concentration 28. Typically, the same solution is used over and over for multiple cycles. The sensor 24 senses the fresh water because of the resulting change of the solution to a very low conductivity or a major reduction in conductivity.

With regard to additive consumption, the additive concentration 28 from the sensor 24 can also be used to determine when an additive reservoir is empty. If the sensor 24 detects a decrease in conductivity, even though the controller system has been instructed to feed additive into the tank 40, then there is probably no additive being fed into the tank 40. However, it could be the situation that someone just recharged the additive reservoir, but some air has gotten into the feed line; it is also possible some of the additive was solidified and it is just eroding slowly in the tank 40 solution; or it is possible that there are other causes of low conductivity. Thus, the microprocessor 10 can be programmed not to indicate an empty additive reservoir unless the tank 40 solution remains at a low conductivity level for some period of time. Other criteria can also be used. With regard to additive feed, the microprocessor 10 compares the corresponding additive concentration set-point 14 with the additive concentration 28 from the sensor 24. Based on this comparison, the microprocessor 10 determines when the solenoid valve 6 should be opened to allow the feeding of additive 30 into the tank 40 and sends an open command 26 to the solenoid valve 6.

Figure 2:
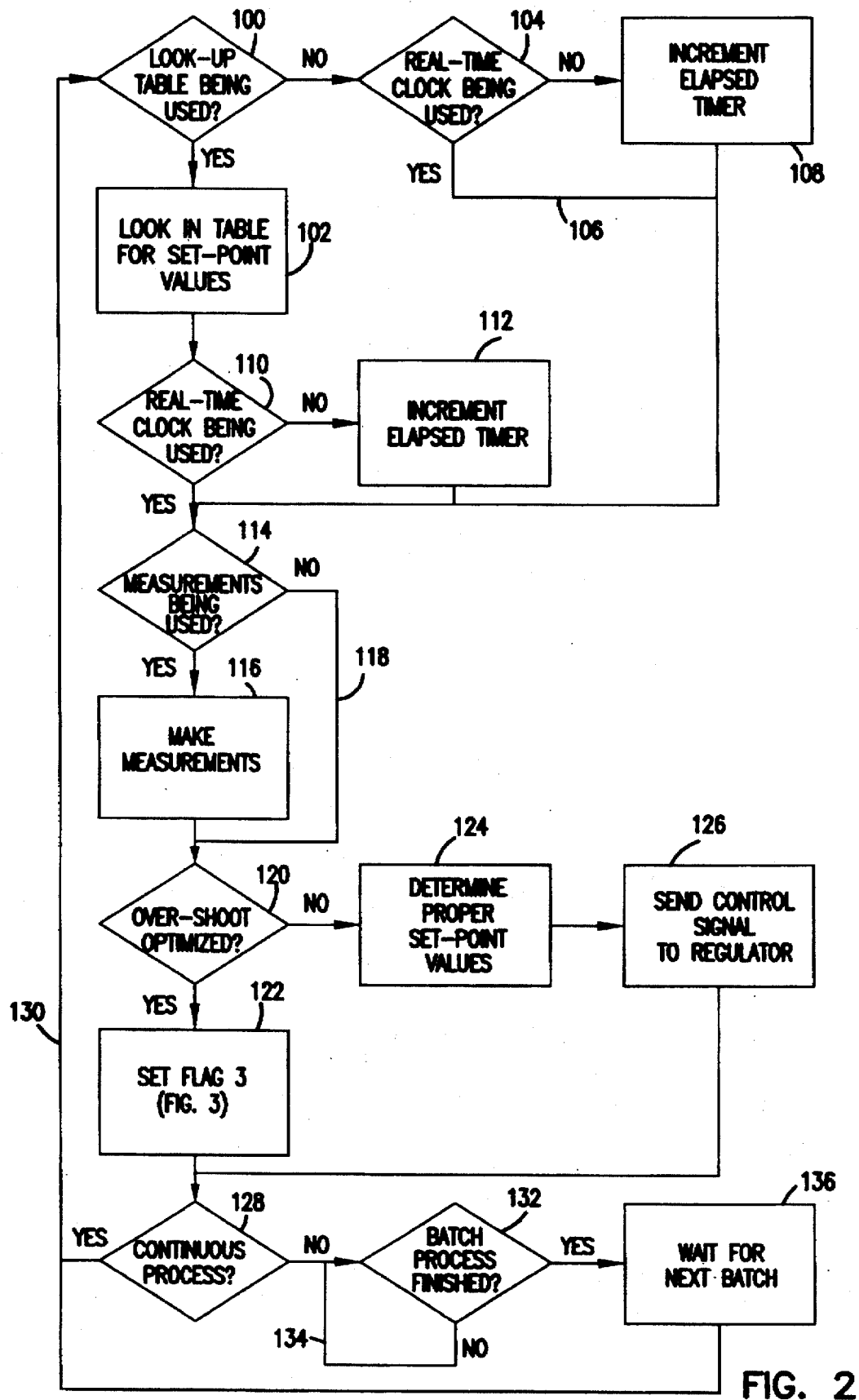
FIG. 2 is a flow chart describing the operation of an additive controller according to the present invention.

FIG. 2 is a flow chart describing how a controller in accordance with the principles of the present invention may automatically regulate the injection of an additive into a system based on control parameters, input data, and timing factors. First, the microprocessor determines whether it is to use a look-up table 100. The look-up table is a user-defined array of set-point values and times, and can be implemented either via hard memory or user input. If the look-up table is to be used, the microprocessor looks in the look-up table for set-point values 102. If the look-up table is not to be used, the microprocessor will determine the set-point value as a function of time.

If the look-up table is not to be used, the controller then determines whether the microprocessor should use a real-time clock 104 or monitor an elapsed time. For example, a real-time clock time source would provide certain advantages to a warewashing machine or an odor control system. In a warewashing machine, peak usage during mealtimes could be programmed into the machine to automatically control rinse agent and detergent injection to compensate for additional soil levels present during meal periods. If a real-time clock is to be used, path 106 is used.

If the elapsed time is to be monitored, path 106 is not used, but rather the elapsed timer is incremented 108. For example, an elapsed timer would provide certain advantages in a lubrication system or a warewashing system. In warewashing systems, the addition of additives such as detergents or rinse agents may be controlled based on the status of an elapsed timer. However, those skilled in the art will recognize that a system can also use the elapsed time method in conjunction with the real-time method of control to provide even more flexibility.

If a look up table was used 100 and the values have been read 102, the microprocessor next determines whether a real time clock is being used 110. If the real time clock is not being used, the microprocessor is using an elapsed time, and must increment the elapsed timer 112. Once the type of clock which is being used is determined, the microprocessor determines if sensor measurements are being used 114. If measurements are being used 114, the requested measurements are made 116 and factored into the appropriate set-point value determination. These measurements may include conductivity, temperature, humidity, or other inputs to the microprocessor. The controller takes into account whether or not a look-up table is being used 100, or whether a real-time clock is being used 104 (or 110). If measurements are not being made 114, the controller advances to the next step 118.

Next, the microprocessor determines if the overshoot control is being used 120. If the overshoot control is being used, then the microprocessor will "set flag 3" 122. Overshoot control is discussed in more detail herein with reference to FIG. 3 below.

In the event that overshoot control is not being used 120, the set-point value is determined directly 124, taking into consideration whether a look-up table is being used 100, whether a real-time clock is being used 104 (or 110), and whether sensor measurements are being used 114. In response to the determination of the set-point value, the controller 12 then sends appropriate control signals to the flow valve 6, step 126.

Next, the controller determines if the process is a continuous process 128. If it is a continuous process, path 130 is used to return the flow to the beginning of the process, decision 100. If the process is not a continuous process, a batch process is being used, and the controller must determine if the batch cycle has yet finished 132. If the batch cycle has not finished, path 134 is used to loop on decision 132. If the batch cycle has finished, the controller waits for the next batch to begin 136. Once the new batch begins, path 130 returns the flow to the beginning of the process, decision 100.

Figure 3:
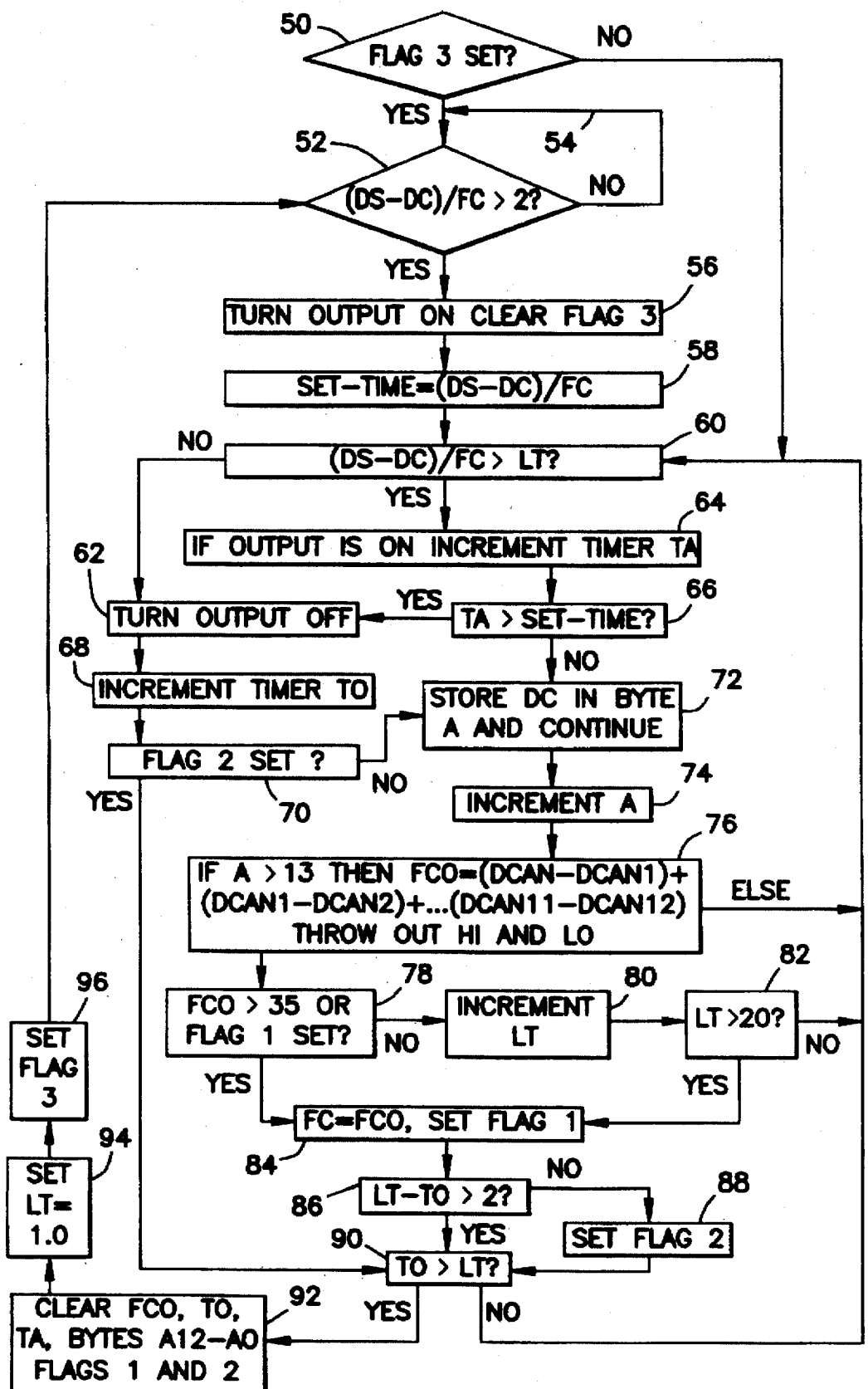
FIG. 3 is a flow chart diagram describing how the controller calculates the appropriate detergent feed time based upon the previous response and a programmed on-off set-point.

FIG. 3 is a flow chart describing the steps performed by the controller 12 during additive feed to achieve, yet not exceed, a pre-set additive concentration level. There must be a balance between overshoot and the need to reach a suitable additive concentration quickly to insure adequate system performance at the beginning of the process. Instead of fixed or adjustable crossover points to proportional mode or adjustments to output response protocols, the controller 12 dispenses additives only by calculating the required feeder on-time, based on the last known flow-rate. After, or in some cases during an additive feed cycle, the additive flow-rate is calculated and either the additive feed time is modified for the current additive feed cycle or it will be used for the next additive feed time calculation. This allows the controller to avoid any on-off type proportioning, and instead use derivative control to achieve the additive concentration set-point quickly and with minimal overshoot. It also inherently gives the controller 12 the capability to optimize additive feed for any of a variety of configurations and system lags without the need to predict them in advance. This learning and comparing cycle is performed each time the controller 12 activates a solenoid valve 6, thus allowing a change to the controller 12 response function if and when conditions change, such as water pressure or temperature. Special challenges exist in the application which require the controller 12 to make up wide differences between the actual additive concentration 28 provided by the sensor 24 and set-point as quickly as possible, again without exceeding set-point. Aggravating the process is a latency time between activating the additive feed and reading the additive concentration information 28 at the sensor 24. The additive feed rate can vary greatly and must be compensated for.

The controller 12 first reads an interrupt condition 50, FLAG 3. FLAG 3 is an indication for the controller 12 to activate the solenoid valve 6 to allow the feeding of additive 30 into the tank 40. If FLAG 3 has not been set, then the controller 12 is in the "control" state and the intermediate flow-rate calculation 60 begins immediately. If FLAG 3 has been set, then the controller 12 determines whether the solenoid valve 6 will be activated for longer than 2 seconds 52, given the last known flow-rate (FC), the current additive concentration (DC) 28 and set-point (DS). If the additive feed will not be ON longer than 2 seconds, then the controller 12 does nothing 54. If the controller 12 determines that the solenoid valve 6 will be activated for longer than 2 seconds, the controller 12 initiates the output (Additive Feed) and FLAG 3 is cleared 56. An output ON time (SET-TIME) is then calculated 58.

Next, the intermediate flow-rate calculation is initiated 60. If the controller 12 determines that the flow-rate has increased to the point where overshoot occurs, then the additive feed is terminated 62. If the flow-rate has not increased, the accumulated ON time (Ta) is incremented 64 and compared with the SET-TIME 66. If the accumulated ON time is not greater than the SET-TIME, then the flow-rate calculation continues. However, if the accumulated ON time is greater than the SET-TIME, the additive feed is terminated 62. Whenever the additive feed is terminated in the above steps 62, the OFF-TIME timer (To) is incremented 68 and the controller 12 determines whether the flow-rate should continue to be calculated 70 by determining whether FLAG 2 has been set. If FLAG 2 has not been set, the flow-rate calculation continues 72. Otherwise, the remaining OFF-TIME is compared to the latency time as discussed below 90. When the flow-rate calculation is resumed 72, the additive concentration 28 is read every 0.1 seconds. The value of the additive concentration 28 is then stored in a memory location indicated by a pointer A 72. The pointer A is then incremented to the next memory location so that the number of stored additive concentration 28 values can be counted 74. Once thirteen additive concentration 28 values have been stored (A>12), then an intermediate flow-rate (Fco) is calculated 76. If Fco has not exceeded 35 microsiemens per second or FLAG 1 is not set 78, the flow-rate is deemed to have not changed and the latency time (LT) is incremented 80. The maximum latency time permitted is 20 seconds. If the output is ON and some latency time has accumulated, but not exceeding 20 seconds 82, then intermediate flow-rate calculation is repeated (back to 60). If the flow-rate is deemed to have changed or if the latency time is greater than 20 seconds, the flow-rate is set to the latest flow-rate 84 and FLAG 1 is set to stop accumulating latency time. With the output OFF, the latency time (LT) and flow-rate (FC) calculations continue if there are more than 2 seconds of OFF-TIME (To) remaining 86 and the OFF-TIME is not greater than the latency time 90. If there are not more than 2 seconds of OFF-TIME remaining 86, then FLAG 2 is set 88. If the OFF-TIME is greater than the latency time 90, the flow-rate is cleared 92. The accumulated on-time, off-time, the storage device, FLAG 1, and FLAG 2 are also cleared 92. The latency time is then reset to one 94. Finally, FLAG 3 is set 96 and recalculation begins again 52 by determining if the additive feed will be on longer than two seconds, given the last know flow-rate (FC), the current additive concentration (DC) 28 and set-point (DS).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An apparatus for controlling at least one variable additive concentration level in a warewashing machine, comprising:

timer means for providing a clock signal;

input means for receiving input to identify at least one system parameter;

processing means, coupled to said timer means and said input means, for determining a first set-point value based on said clock signal and said system parameters and for generating a control signal to control said additive concentration level in response thereto; and regulating means, coupled to said processing means, for regulating said additive concentration level based on said control signal from said processing means.

2. The apparatus of claim 1, wherein the input means further comprises a data entry means for entering user-defined inputs comprising at least one user-defined time associated with a corresponding initial set-point value.

3. The apparatus of claim 2, wherein said processing means further determines a first set-point value based on said user-defined inputs and said clock signal.

4. The apparatus of claim 1, wherein the input means further comprises a data entry means for entering at least one user-defined time associated with a corresponding initial set-point value, and at least one control parameter.

5. The apparatus of claim 4, wherein said processing means further determines a first set-point value based on said user-defined time, said clock signal, and said control parameter.

6. The apparatus of claim 4, wherein said control parameter is at least one elapsed time.

7. The apparatus of claim 6, wherein said processing means further determines a first set-point value based on said control parameter, said elapsed time, and said clock signal.

8. The apparatus of claim 1, wherein said system parameter is at least one elapsed time.

9. The apparatus of claim 8, wherein said processing means further determines a first set-point value based on said elapsed time and said clock signal.

10. The apparatus of claim 1, wherein said input means further comprises a sensor for measuring the system parameter and generating a sensor signal in response thereto.

11. The apparatus of claim 10, said processing means further determining a set-point value based on said sensor signal and said clock signal.

12. The apparatus of claim 10, said processing means further determining a set-point value based on said system parameters, said sensor signal, and said clock signal.

13. The apparatus of claim 10, wherein said sensor measures temperature.

14. The apparatus of claim 10, wherein said sensor measures humidity.

15. The apparatus of claim 1, wherein said processing means further determines a second set-point value corresponding to a second additive concentration level, wherein said second set-point value is controlled independently of said first set-point value.

16. A method for controlling at least one variable additive concentration level in a warewashing machine, comprising the steps of:

providing a clock signal;

inputting at least one system parameter;

determining at least one set-point value based on said clock signal and said system parameters;

generating a control signal to control said additive concentration level in response to at least one determined set-point value; and regulating said additive concentration level based on said control signal by controlling an amount of additive injected into said warewashing machine.

17. The method of claim 16, wherein the step of inputting the system parameters further comprises the step of entering at least one user-defined time with a corresponding initial set-point value.

18. The method of claim 17, wherein the step of determining at least one set-point value is based on at least one user-defined time and said clock signal.

19. The method of claim 16, wherein the step of inputting the system parameters further comprises the step of entering at least one user-defined time associated with a corresponding initial set-point value, and at least one control parameter.

20. The method of claim 19, wherein the step of determining at least one set-point value is based on at least one user-defined time, said clock signal, and said control parameter.

21. The method of claim 19, wherein the step of inputting the system parameters further comprises the step of entering at least one control parameter that is an elapsed time.

22. The method of claim 21, wherein the step of determining at least one set-point value is based on at least one user-defined time, said elapsed time, and said clock signal.

23. The method of claim 16, wherein the step of determining at least one set-point value further comprises the step of defining a system parameter as an elapsed time.

24. The method of claim 23, wherein the step of determining at least one set-point value is based on said elapsed time and said clock signal.

25. The method of claim 16, wherein the step of inputting the system parameters further comprises the step of measuring at least one system parameter with a sensor and generating a signal in response thereto.

26. The method of claim 25, wherein the step of determining at least one set-point value is based on said sensor measurement and said clock signal.

27. The method of claim 25, wherein the step of determining at least one set-point value is based on said sensor measurement, said system parameters, and said clock signal.

28. The method of claim 25, wherein said system parameter is temperature.

29. The method of claim 25, wherein said system parameter is humidity.

30. The method of claim 16, wherein the step of determining at least one set-point value further comprises the step of determining a second set-point value corresponding to a second additive concentration level, wherein said second set-point value is controlled independently of said first set-point value.

31. An apparatus for controlling at least one variable additive concentration level in a machine, comprising:

a clock for providing a timing signal;

input means for entering at least one system parameter;

processing means, coupled to said timer means and said input means, for determining at least one set-point value based on said system parameters and for generating a control signal to control said additive concentration level in response thereto; and regulating means, coupled to said processing means, for regulating said additive concentration level based on said control signal from said processing means.

32. The apparatus of claim 31, wherein said system parameter is at least one elapsed time.

33. The apparatus of claim 31, further comprising a sensor for measuring at least one system parameter and generating a signal in response thereto.

34. The apparatus of claim 33, wherein said processing means determines a set-point value based on said sensor signal, said timing signal, and said system parameters.

35. The apparatus of claim 31, wherein said processing means further determines a second set-point value corresponding to a second additive concentration level, wherein said second set-point value is controlled independently of said first set-point value.

* * * * *

UNITED STATES PATENT AND TRADEMARK OFFICE
CERTIFICATE OF CORRECTION

PATENT NO. : 5,681,400

DATED : October 28, 1997

INVENTOR(S) : Daniel F. Brady, et al.

It is certified that error appears in the above-identified patent and that said Letters Patent is hereby corrected as shown below: Title page;

item [75] Inventor Line – Delete the word "Burnsville" and insert the words —Apple Valley—.

Signed and Sealed this

Twenty-fifth Day of August, 1998

Attest:

Attesting Officer

BRUCE LEHMAN

Commissioner of Patents and Trademarks